(12) United States Patent
Nandakumar

(10) Patent No.: US 10,042,859 B1
(45) Date of Patent: Aug. 7, 2018

(54) CHRONOLOGICAL BASED RETENTION FOR OBJECTS ARCHIVED THROUGH A WEB-BASED STORAGE INTERFACE FOR ILM

(71) Applicant: Open Text Corporation, Waterloo (CA)

(72) Inventor: Shanmuga S. Nandakumar, Bangalore (IN)

(73) Assignee: Open Text Corporation, Waterloo (CA)

(*) Notice: Subject to any disclaimer, the term of this patent is extended or adjusted under 35 U.S.C. 154(b) by 214 days.

(21) Appl. No.: 14/040,527

(22) Filed: Sep. 27, 2013

(51) Int. Cl.
*G06F 17/30* (2006.01)

(52) U.S. Cl.
CPC .............. *G06F 17/30194* (2013.01)

(58) Field of Classification Search
CPC ..... H04L 67/02; H04L 67/28; H04L 67/1002; H04L 67/16; H04L 29/08729; G06F 17/301; G06F 17/30106; G06F 17/30194; G06F 17/30011; Y10S 707/99933
USPC .......... 707/694, 662, 663, 665, 689
See application file for complete search history.

(56) References Cited

U.S. PATENT DOCUMENTS

| | | | |
|---|---|---|---|
| 7,818,300 B1* | 10/2010 | Kilday et al. | 707/662 |
| 8,683,144 B2* | 3/2014 | Atluri et al. | 711/154 |
| 2006/0179087 A1* | 8/2006 | Fujii | G06F 3/0611 |
| 2007/0033200 A1* | 2/2007 | Gillespie | G06Q 10/10 |
| 2007/0106710 A1* | 5/2007 | Haustein | G06F 3/0605 |
| 2008/0059543 A1* | 3/2008 | Engel | G06F 17/30011 |
| 2009/0125572 A1* | 5/2009 | Cannon | G06F 17/30188 |
| 2010/0138500 A1* | 6/2010 | Consul | G06Q 10/107 |
| | | | 709/206 |
| 2011/0191306 A1* | 8/2011 | Akagawa | G06F 17/30117 |
| | | | 707/692 |
| 2012/0030180 A1* | 2/2012 | Klevenz et al. | 707/661 |
| 2014/0019498 A1* | 1/2014 | Cidon | G06F 17/3007 |
| | | | 707/827 |
| 2014/0059023 A1* | 2/2014 | Freeman et al. | 707/694 |
| 2014/0317157 A1* | 10/2014 | Sparkes | G06F 17/30188 |
| | | | 707/822 |

OTHER PUBLICATIONS

Title: Exchange Store WebDAV Protocol Author: Microsoft Publication Date: Apr. 4, 2010 https://msdn.microsoft.com/en-us/library/aa143161(v=exchg.65).aspx.*

(Continued)

*Primary Examiner* — Tarek Chbouki
(74) *Attorney, Agent, or Firm* — Sprinkle IP Law Group

(57) ABSTRACT

A retention date-time request is received via a web-based filesystem protocol, wherein: a) the retention date-time request is received from an information lifecycle management ("ILM") component; b) the ILM component comprises a performance requirement to apply a retention date-time to a filesystem object; and c) the retention date-time request is for the filesystem object in a content management system. The retention date-time request is extracted to process a retention date-time within a meta information store associated with a document content server. A records manager is enabled to use the document content server meta information store for policy enforcement processes.

21 Claims, 9 Drawing Sheets

(56) References Cited

OTHER PUBLICATIONS

Title: WebDAV Storage Interface for SAP NetWeaver Information Lifecycle Management—(BC-ILM) Author: Chiranjivi R D Source: SAP Community Network Publisher: SAP(Official) Publication Date: Jun. 28, 2008 http://scn.sap.com/docs/DOC-8734.*

"SAP's Strategy for End-to-End ILM success: The Information Lifecycle Management Solution from SAP Bridges the Gap Between Applicantions and Storage Technology for Legal Compliance" dated Jan. 1, 2008.*

* cited by examiner

EXISTING TECHNIQUE

EXISTING TECHNIQUE

EXISTING TECHNIQUE

CHRONOLOGICAL BASED RETENTION FOR OBJECTS ARCHIVED THROUGH A WEB-BASED STORAGE INTERFACE FOR ILM

BACKGROUND OF THE INVENTION

Information Lifecycle Management ("ILM") components may provide end-to-end lifecycle management capabilities on documents or folders archived on an external storage system like a document content server.

Applying retention on attachments, documents or folders archived from an ILM component through a web-based filesystem protocol is an important function of content management systems and records management systems. Retention and retention policies are and also an important part of records management and other content management applications and systems to automate the process of managing attachments, files, documents, folders, objects, and/or records in accordance with applicable legal, business, or other requirements, for example Sarbanes-Oxley Act requirements or Department of Defense requirements.

BRIEF DESCRIPTION OF THE DRAWINGS

Various embodiments of the invention are disclosed in the following detailed description and the accompanying drawings.

DETAILED DESCRIPTION

Figure 1:
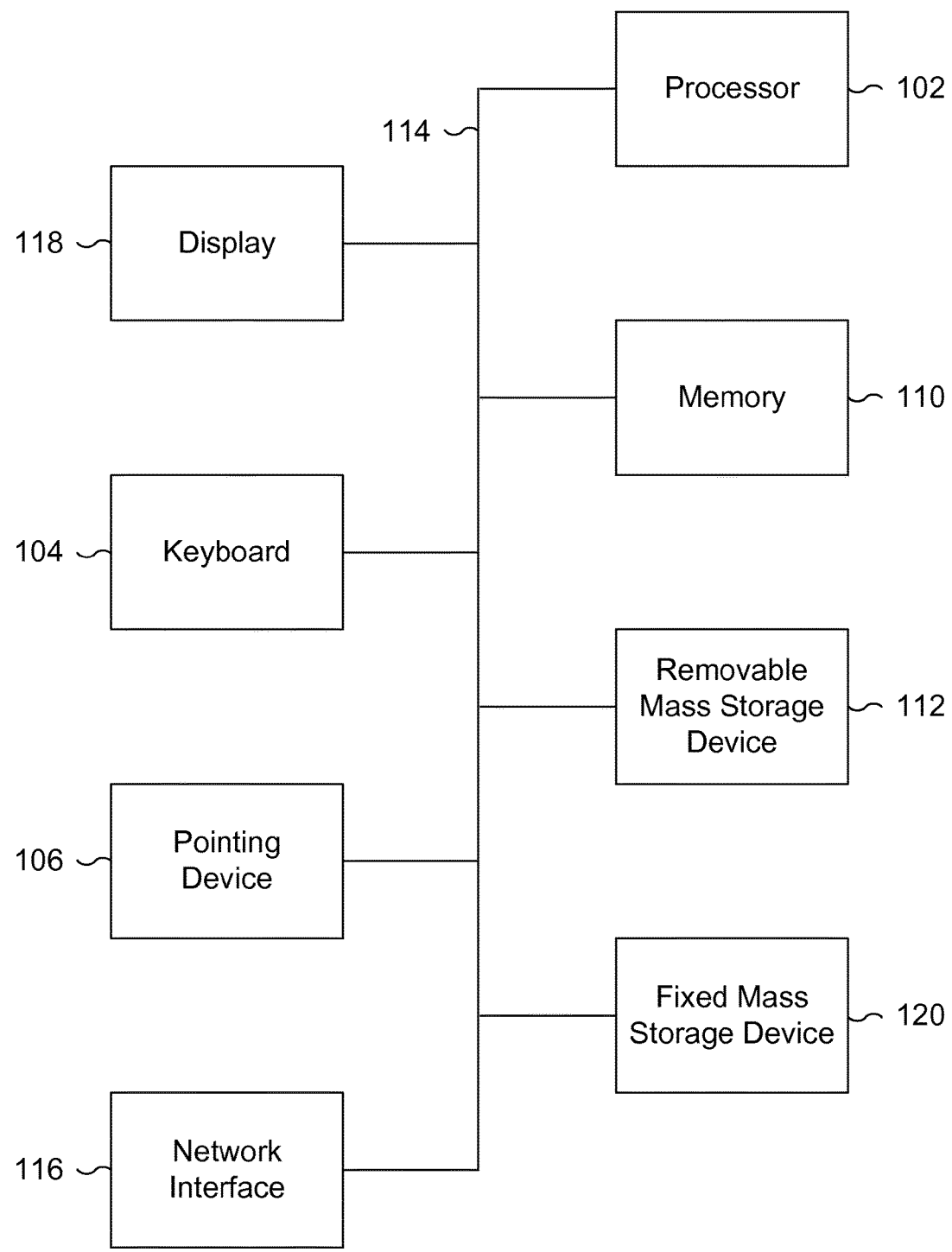
FIG. 1 is a functional diagram illustrating a programmed computer system for distributed workflows in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A chronological based strategy for applying retention on filesystem objects archived from an Information Lifecycle Management (ILM) component through a WebDAV interface is disclosed. The chronological-based strategy amends an event-based strategy used in various records management and retention policy services ("RM/RPS") application programming interfaces ("APIs").

Without loss of generality, an example of an ILM component is SAP ILM using a BC-ILM3.0 interface. Without loss of generality, an example of a document content server ("DCS") is given for EMC Documentum Content Server. Without loss of generality, an example of a web-based filesystem protocol is the WebDAV protocol. Without loss of generality, an example of an RM/RPS API is the EMC Documentum RM/RPS API. Any person having ordinary skill in the art will understand that these techniques may be applied generally beyond the specific examples and software packages given here.

Throughout this specification, a filesystem object may without limitation refer to one or more of the following: an attachment, a file, a document, a folder, an object, and a record.

As mentioned earlier, ILM components provide end-to-end lifecycle management capabilities on the filesystem objects archived on an external storage interface like EMC Documentum Content Server. The WebDAV protocol may be used to propagate ILM metadata on the filesystem objects archived on an external storage system. In some embodiments, the WebDAV 'PROPPATCH' and 'PROPFIND' are the type of requests used to set or get the retention value associated with a specific filesystem object. Other WebDAV requests can include a MkCol (add folder) request, a Put (add document) request, and a Delete (delete folder and/or document) request.

Retention is an important capability in the scope of ILM for filesystem objects archived on a DCS. An ILM enabled component can make use of the DCS as an external storage system for archiving filesystem objects using a WebDAV interface. Retention propagation is effectively setting the retention date on a given filesystem object archived on a DCS. Retention applied on a filesystem object ensures that the filesystem object cannot be deleted until the expiration date set on the filesystem object is met. Inheritance propagation may also be specified as propagating the expiration date from a parent filesystem object (e.g. folder) to its child filesystem objects like subfolders and documents within the parent folder.

In one embodiment, ILM metadata properties may be sent to the DCS through a WebDAV interface. An "ILM Connector" type component interfaces the ILM component with the DCS. In one embodiment, the DCS relies on a RM/RPS API to apply retention policy on the archived documents. In various instances, the RM/RPS attaches a policy on the filesystem object to which the retention is to be applied, using an event-based approach to store the corresponding retention date to be applied.

A primary disadvantage of the event-based approach is that an event needs to be created within the RM/RPS to store the corresponding ILM metadata passed in from the ILM Component. For example, to store a passed in retention from the ILM component a specific event like 'expiration_date' needs to be created within the RM/RPS. After it is created, the 'expiration_date' event will be used to store the passed in retention value from the ILM component. Similarly, for fetching a corresponding retention value the 'expiration_date' event has to be read. Thus, often there is no direct lookup facility to set or fetch the retention value within RM/RPS.

The problem with an event-based approach becomes more significant as the number of properties to store for a given archived filesystem object (document and/or folder) increase. This would result in creation of several events within the RM/RPS to hold each of these properties for the associated document or folder. Effectively this means iterating through all the events associated with the filesystem object within the RM/RPS to fetch or store the retention. This iteration on events may need to span across the inheritance hierarchy for inheritance propagation for retention. This makes it inefficient in terms of time and performance given that we have to constantly iterate through all the events associated with the filesystem object to fetch or set the corresponding retention value as most of the ILM operations pertain to retention properties.

Chronological-Based Retention

Chronological-based retention for archived filesystem objects on a DCS from an ILM component through the web-based filesystem protocol is disclosed.

Chronological-based retention enhances performance by reducing the time taken to set the retention on the archived filesystem objects in the DCS. In many embodiments, every filesystem object including every document or folder stored in the DCS inherits certain properties. 'i_retain_until' is one such property which is used to store the date. Within event-based retention, this property is not fully exploited. Chronological-based retention effectively exploits this retention property to store the retention time on the archived filesystem object more directly.

By storing the retention value in the retention property more directly, this improves performance in comparison to the event-based approach used by the RM/RPS API to set the retention time. Improving performance allows ILM connectors to meet ILM requirements of components, for example meeting the performance criteria given by SAP for BC-ILM 3.0 certification for an ILM Connector component. This technique can be used with any ILM component propagating ILM metadata to a DCS using a web-based filesystem protocol like the WebDAV interface.

FIG. 1 is a functional diagram illustrating a programmed computer system for distributed workflows in accordance with some embodiments. As shown, FIG. 1 provides a functional diagram of a general purpose computer system programmed to execute workflows in accordance with some embodiments. As will be apparent, other computer system architectures and configurations can be used to execute workflows. Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display 118.

Processor 102 is coupled bi-directionally with memory 110, which can include a first primary storage, typically a random access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown.

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, WiFi, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through network interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits ("ASIC" s), programmable logic devices ("PLD" s), and ROM and RAM devices. Examples of program code include both machine code, as produced, for example, by a compiler, or files containing higher level code, for example a script, that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
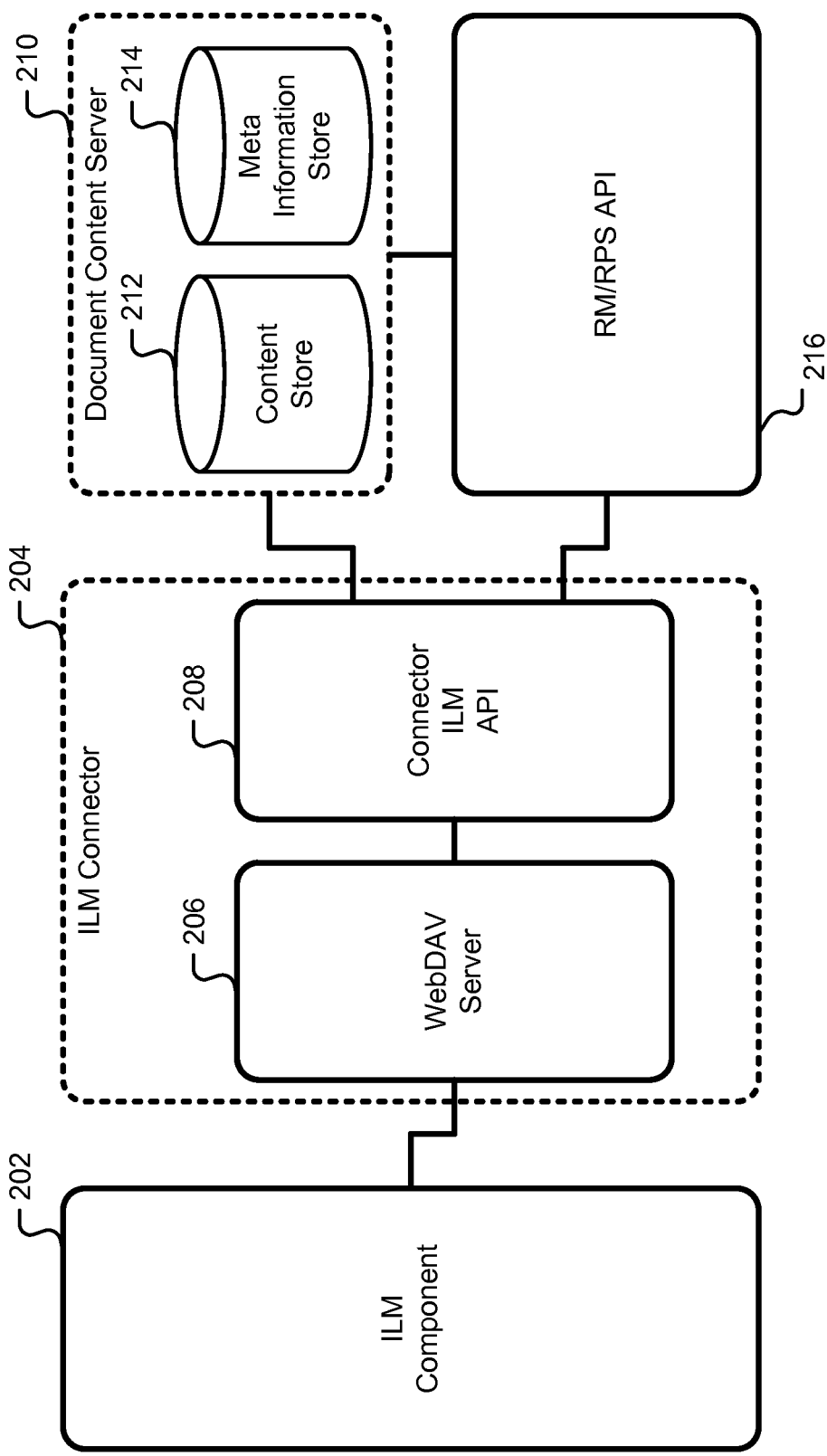
FIG. 2 is a block diagram illustrating an embodiment of a content management system with retention.

FIG. 2 is a block diagram illustrating an embodiment of a content management system with retention.

ILM Component 202 provides end-to-end lifecycle management capabilities on the filesystem objects archived on an external storage interface like a DCS 210. The ILM Component 202 is coupled to DCS 210 via an ILM Connector 204. An RM/RPS API 216 coupled to DCS 210 is used to provide event-based approach to storing metadata like a corresponding retention date.

ILM Connector 204 comprises a web-based filesystem protocol server 206 (here shown without loss of generality as a WebDAV server) and a Connector ILM API 208. ILM Connector 204 may receive, for example, the PROPPATCH and PROPFIND requests from the ILM Component 202 through WebDAV server layer 206. The WebDAV server 206 processes WebDAV requests and Connector ILM API 208 provides an API for interpreting the WebDAV requests for the DCS 210 and RM/RPS API 216.

DCS 210 comprises a content store 212 and a meta information store 214. Without loss of generality, the DCS 210 and its associated content store 212 and metadata store 214 may be implemented in a single or plurality of platters, discs, drives, servers, data centers, or locations.

Figure 3:
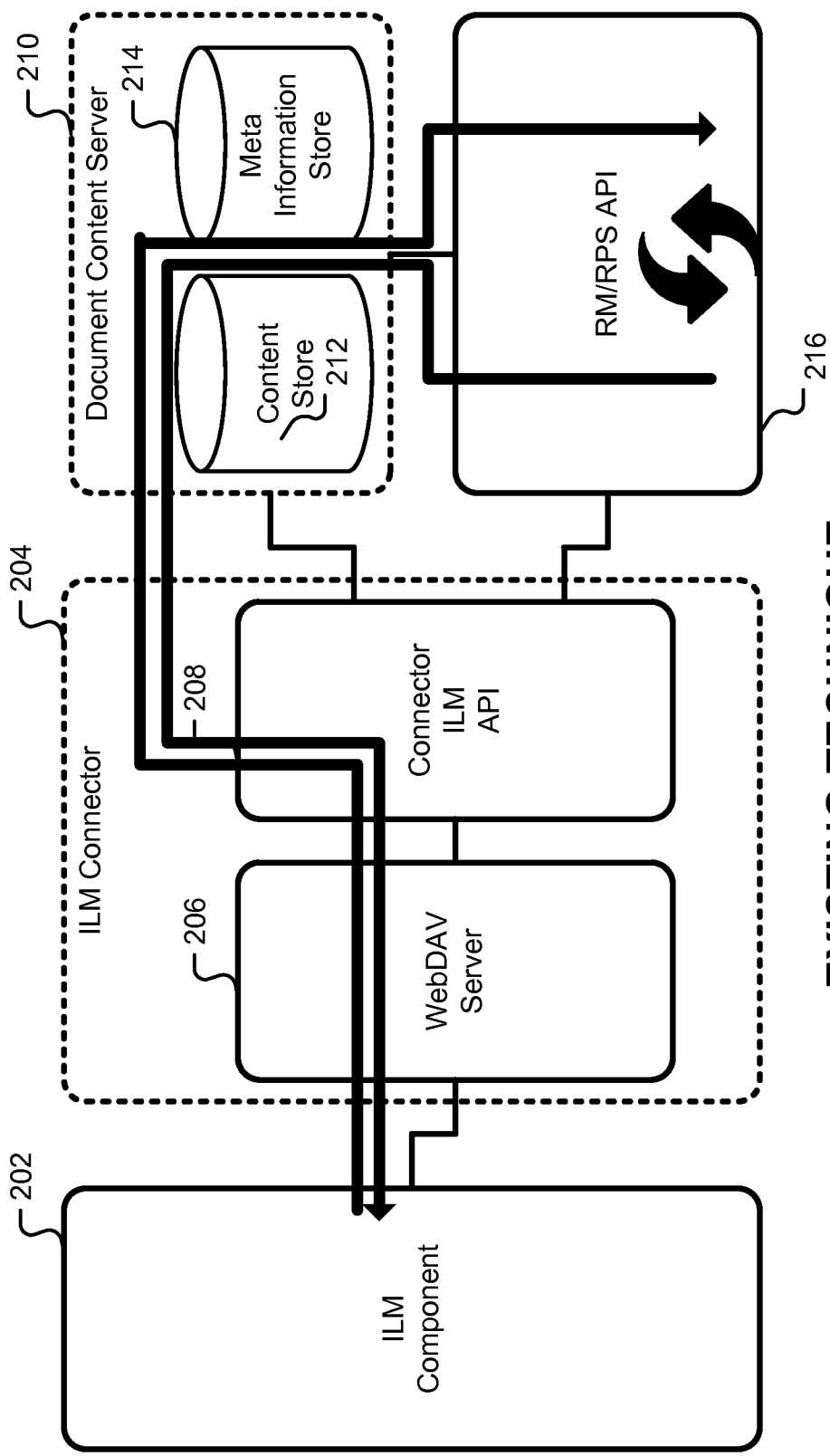
FIG. 3 is a block diagram illustrating an embodiment of event-based retention for a content management system.

FIG. 3 is a block diagram illustrating an embodiment of event-based retention for a content management system. For example, this is an existing technique used for retention and other properties of content objects in content store 212.

ILM Connector 204 receives a PROPPATCH and/or PROPFIND request from ILM Component 202, shown in the thick black line. The WebDAV Server 206 interprets and passes it to Connector ILM API 208, which then passes it through DCS 210 to RM/RPS API 216 to set or fetch the retention respectively. The RM/RPS 216, being event-based, iterates through existing events to find an appropriate event to set or fetch the passed in retention value, shown with two revolving arrows. Feedback from the iteration is then passed back to ILM Component 202 through DCS 210 and ILM Connector 204.

Figure 4:
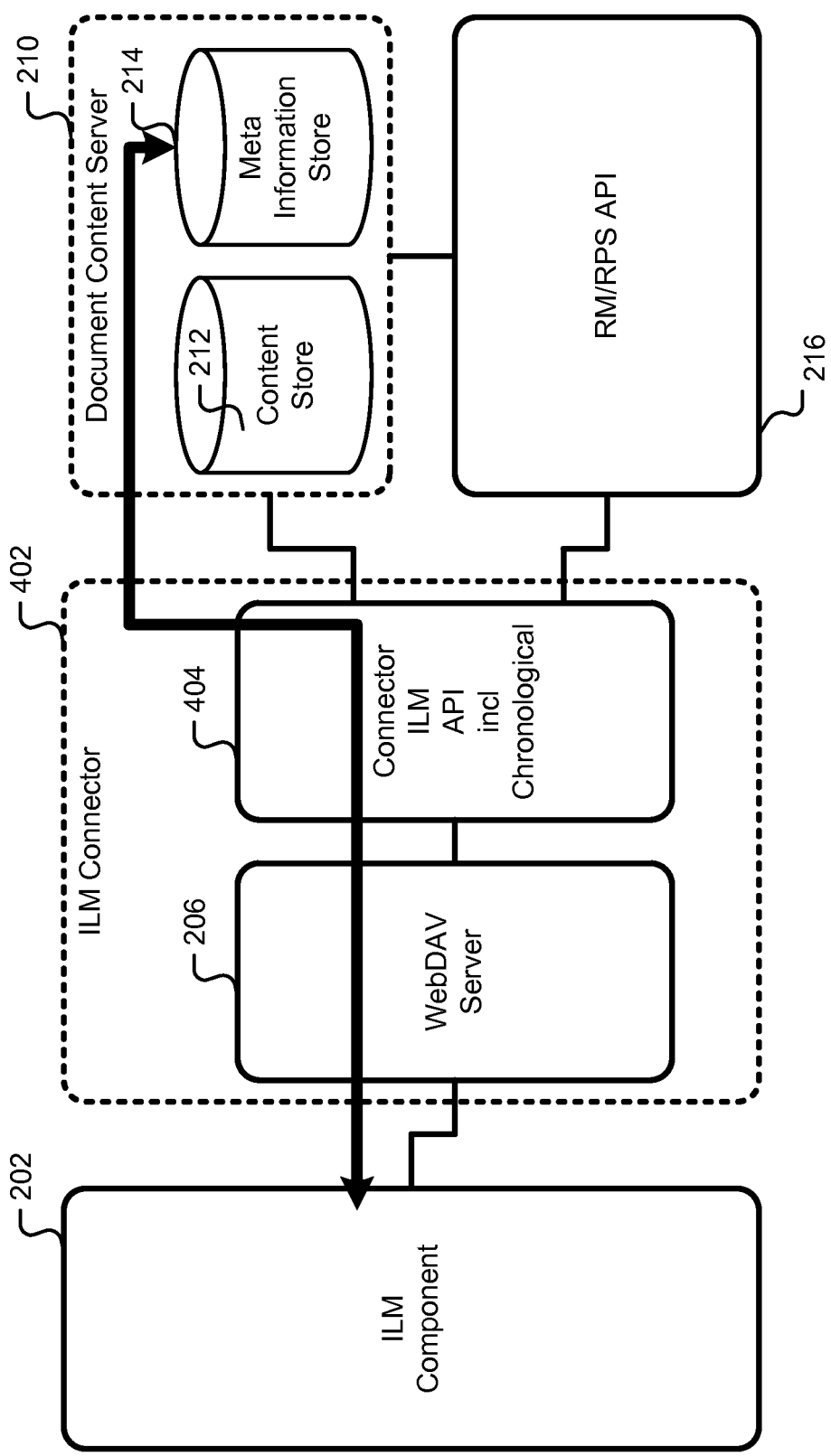
FIG. 4 is a block diagram illustrating an embodiment of chronological-based retention for a content management system.

FIG. 4 is a block diagram illustrating an embodiment of chronological-based retention for a content management system. This may be used (partially) in lieu of the event-based retention technique shown in FIG. 3.

ILM Connector 204 with the Chronological-based ILM Connector 402 including Connector ILM API 404, receives a PROPPATCH and/or PROPFIND request from ILM Component 202, shown in the thick black line. Instead of the iterations within RM/RPS 216 shown in FIG. 3, the Connector ILM API 404 takes the interpreted request from WebDAV Server 206 and instead makes use of a retention property associated with an associated filesystem object (e.g. a document or folder) archived in the DCS 210 to store or fetch the retention date. With the Connector ILM API 404 directly associating the retention property with the content in DCS 210, no iteration through events is required, improving performance. The RM/RPS API 216 is used to mainly apply retention policy to a filesystem object. An example of a retention policy is a hold on the associated filesystem object (e.g. a folder or document) and in some embodiments be meaningless without the corresponding retention date.

Figure 5:
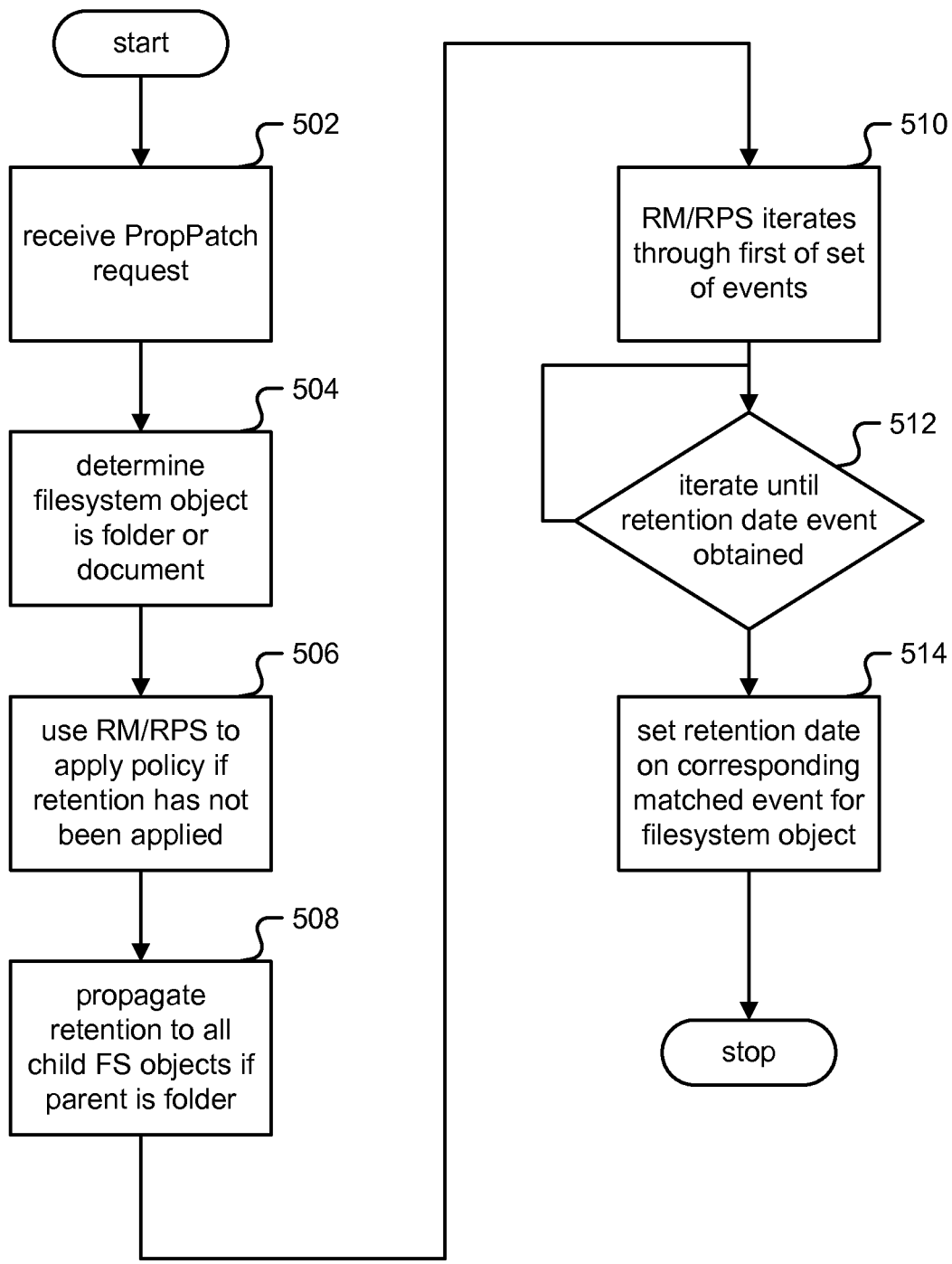
FIG. 5 is a flow chart illustrating an embodiment of setting event-based retention for a content management system.

FIG. 5 is a flow chart illustrating an embodiment of setting event-based retention for a content management system. In some embodiments the flow chart of FIG. 5 is carried out by one or more components of FIG. 3 including ILM Connector 204.

In step 502, the ILM Connector 204 receives a WebDAV PROPPATCH request containing the retention date to be set, wherein it nominally receives it from the ILM Component 202. The PROPPATCH WebDAV request is used to manipulate or set any property associated with the filesystem object archived from the ILM Component 202 through the WebDAV protocol. In step 504, it is determined whether the retention is to be applied on a folder-type, document-type, or other filesystem object.

In step 506, the RM/RPS API 216 is used to apply a retention policy to the filesystem object if retention has not already been applied. Again, a retention policy is essentially like a hold on a given object and is meaningless without the corresponding retention date being set. In step 508, if the filesystem object is determined to be a folder or other similar object in step 504, retention is inheritance propagated to each of its associated child filesystem objects in a similar manner to step 506.

In step 510 (first set of events) and step 512 (subsequent events), the RM/RPS API 216 iterates through all the events associated with the filesystem object of step 502 (or the association child filesystem objects from step 508, if applicable) and finds the corresponding event to which the iteration needs to be set. Once the event is identified the retention date is set on the event in step 514. This iteration of steps 510, 512, through 514 is carried out on any child filesystem objects that are inheritance propagated to from step 508 with the retention date to the various levels as needed.

Figure 6:
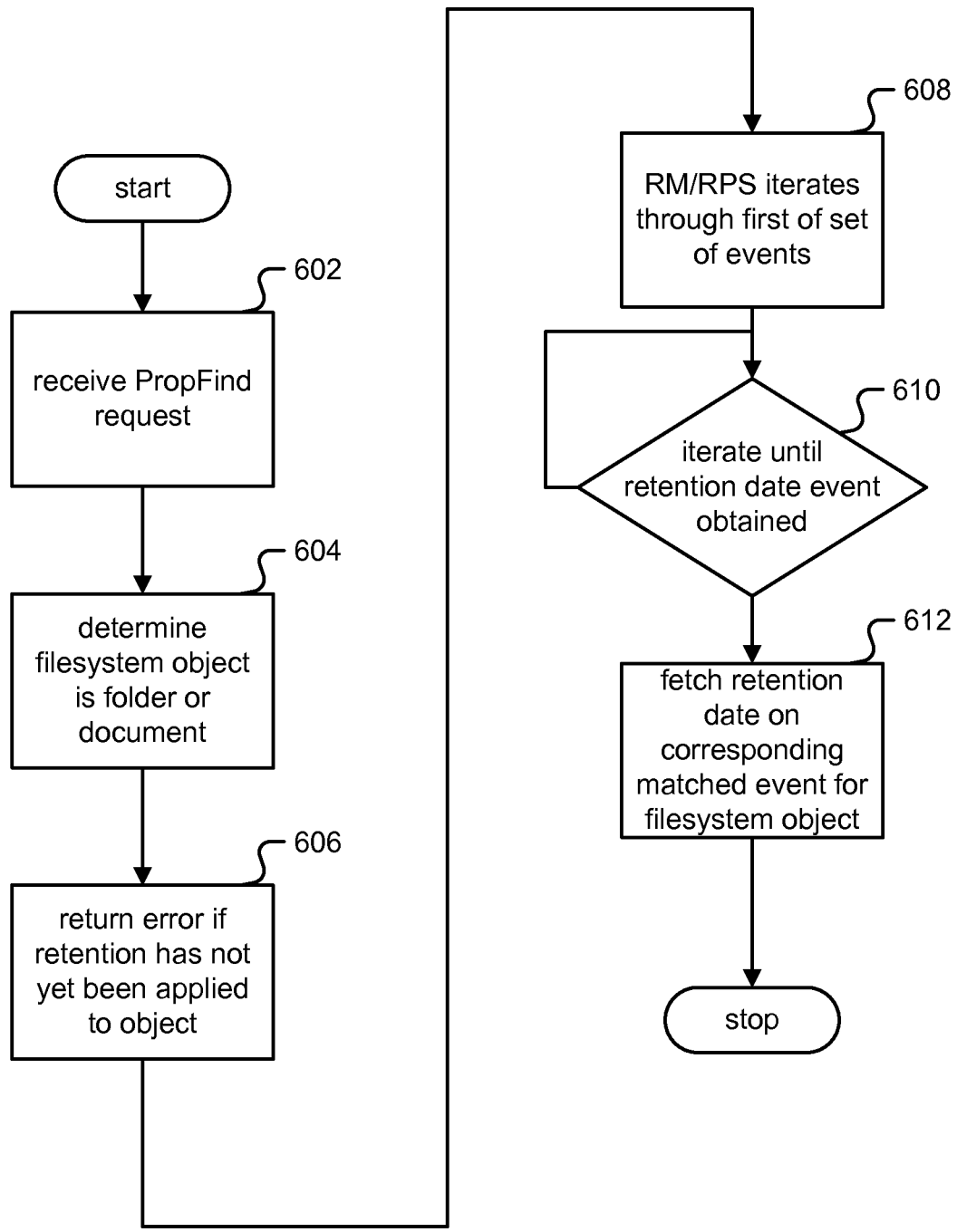
FIG. 6 is a flow chart illustrating an embodiment of fetching event-based retention for a content management system.

FIG. 6 is a flow chart illustrating an embodiment of fetching event-based retention for a content management system. In some embodiments the flow chart of FIG. 6 is carried out by one or more components of FIG. 3 including ILM Connector 204.

In step 602, the ILM Connector 204 receives a WebDAV PROPFIND request, used to fetch the corresponding retention date associated with a filesystem object like a document or folder, wherein it nominally receives it from the ILM Component 202. The PROPFIND WebDAV request is used to fetch any property value associated with, for example, an archived document or folder.

In step 604, it is determined whether the retention values are to be fetched from a folder-type, document-type, or other filesystem object. In step 606, it is determined whether the retention is applied on the filesystem object for which the retention date is to be fetched. If there is no retention applied then an error message is sent to the ILM Component 202.

On the other hand, if retention is applied, in steps 608 (first set of events) and 610 (subsequent events), the RM/RPS API 216 iterates through all the events associated with the filesystem object of step 602 to find out the event of interest and the retention date is fetched from the matched event in step 612. The fetched retention date may be sent to the ILM Component 202.

Figure 7:
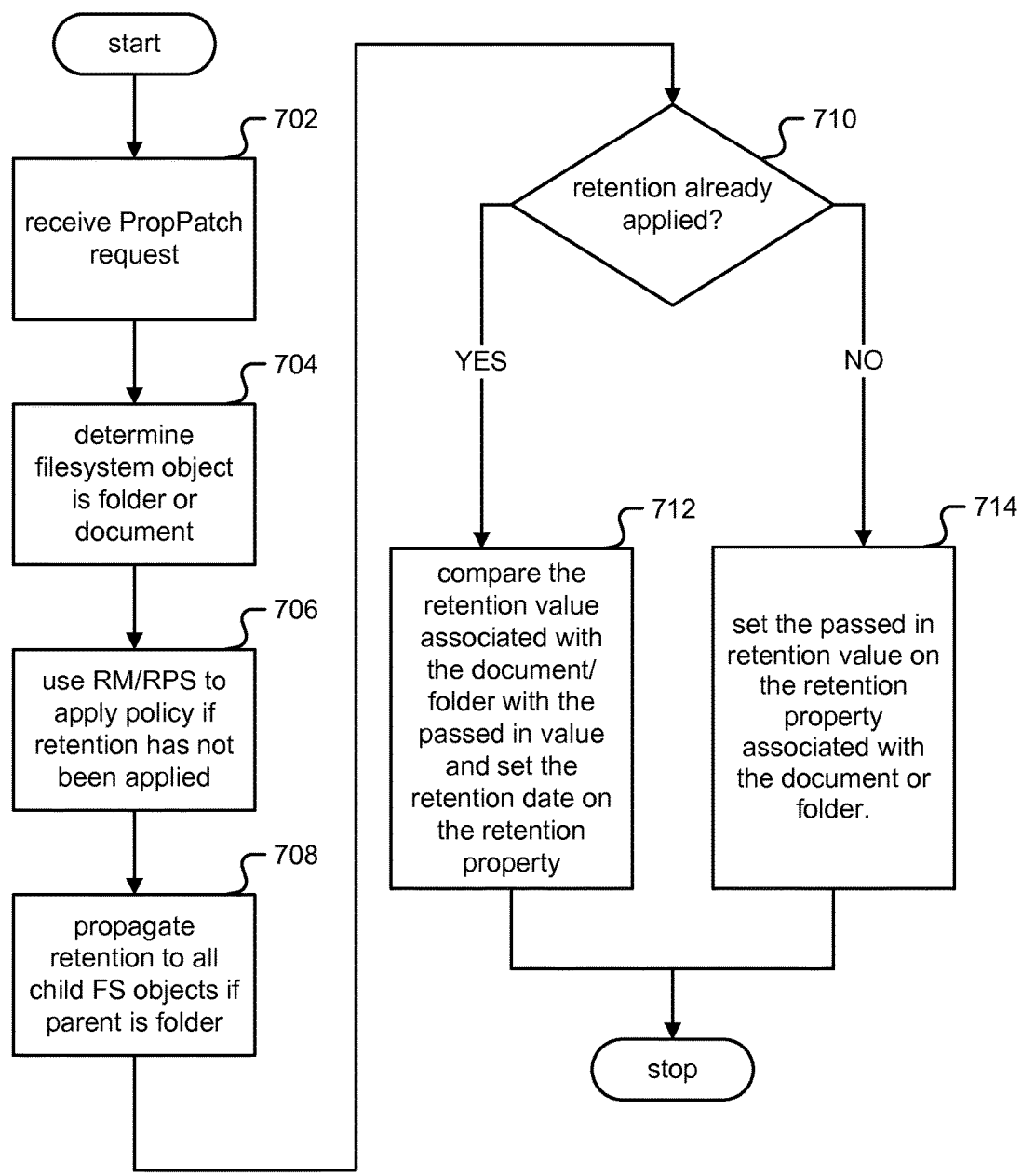
FIG. 7 is a flow chart illustrating an embodiment of setting chronological-based retention for a content management system.

FIG. 7 is a flow chart illustrating an embodiment of setting chronological-based retention for a content management system. In some embodiments the flow chart of FIG. 7 is carried out by one or more components of FIG. 4 including ILM Connector 402.

Similar to steps 502-508, in step 702, the ILM Connector 402 receives a WebDAV PROPPATCH request containing the retention date to be set, wherein it nominally receives it from the ILM Component 202. In step 704, it is determined whether the retention is to be applied on a folder-type, document-type, or other filesystem object.

In step 706, the RM/RPS API 216 is used to apply a retention policy to the filesystem object if retention has not already been applied. In step 708, if the filesystem object is determined to be a folder or other similar object in step 704, retention is inheritance propagated to each of its associated child filesystem objects in a similar manner to step 706.

At step 710, it is determined if retention is already applied to the filesystem object in question (either parent object from step 702 or child objects, if applicable, from step 708). If it is already applied, control is transferred to step 712, wherein the retention property value associated with the folder-type (or document-type, or other filesystem object) is compared with the passed in retention value and if valid the retention value is directly set on the retention property. That is, after retention is applied, the ILM Connector 402 component applies the passed in retention date on the retention property associated with the filesystem object. If retention was not already applied, control is instead transferred to step 714, and the passed in retention value is directly set on the retention property associated with the filesystem object.

Figure 8:
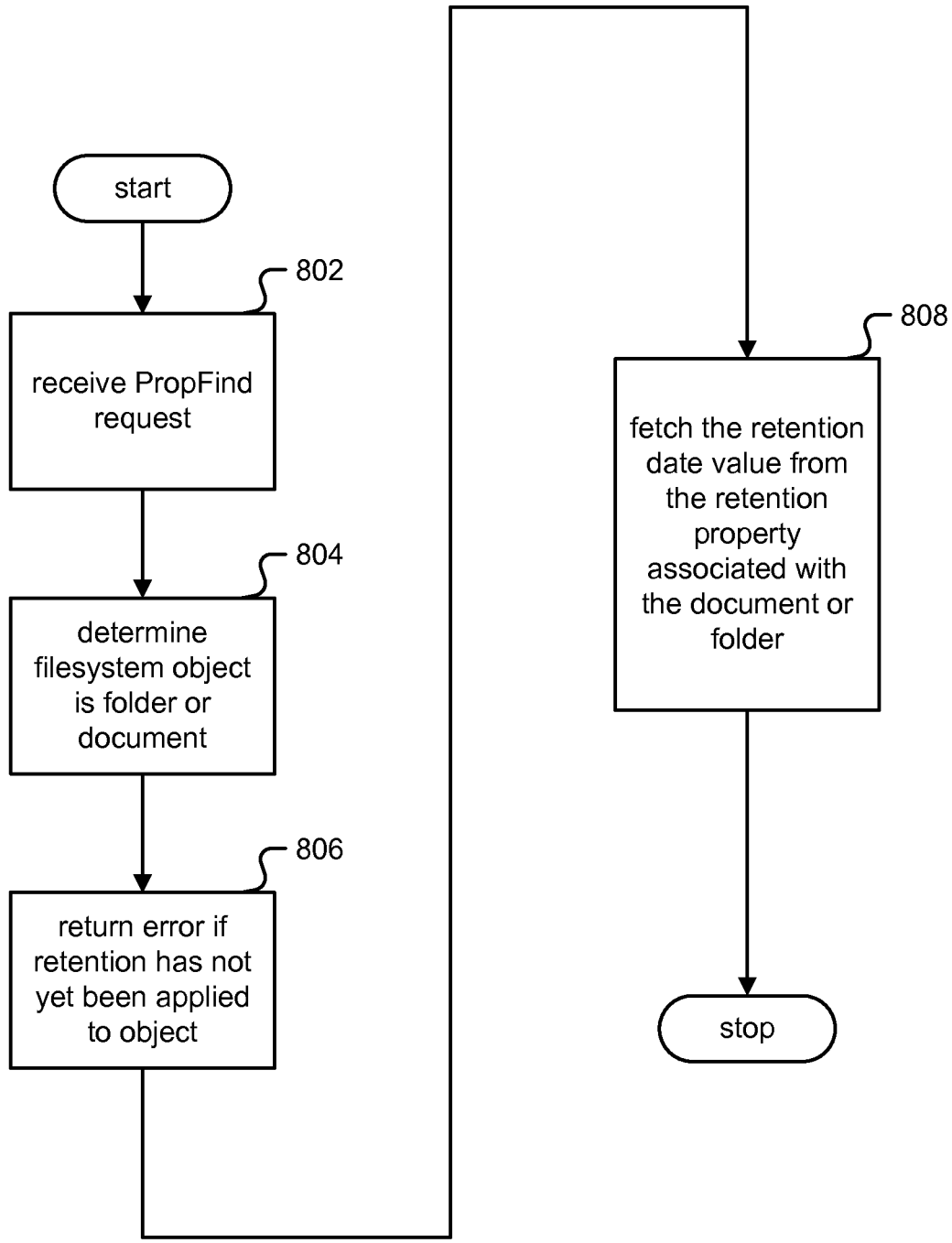
FIG. 8 is a flow chart illustrating an embodiment of fetching chronological-based retention for a content management system.

FIG. 8 is a flow chart illustrating an embodiment of fetching chronological-based retention for a content management system. In some embodiments the flow chart of FIG. 8 is carried out by one or more components of FIG. 4 including ILM Connector 402.

Similar to steps 602-606, in step 802, the ILM Connector 402 receives a WebDAV PROPFIND request, wherein it nominally receives it from the ILM Component 202. In step 804, it is determined whether the retention is applied on a folder-type, document-type, or other filesystem object. In step 806, if there is no retention applied then an error message is sent to the ILM Component 202. In step 808, the retention property value associated with the filesystem object is directly fetched. This retention value may be sent to the ILM Component 202.

Figure 9:
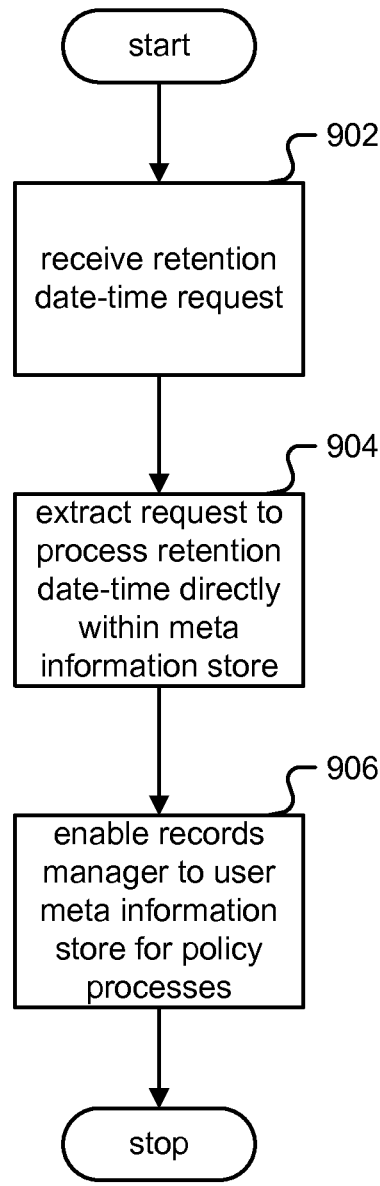
FIG. 9 is a flow chart illustrating an embodiment for chronological-based retention.

FIG. 9 is a flow chart illustrating an embodiment for chronological-based retention. In some embodiments the process of FIG. 9 may be carried out by ILM Connector 402 in FIG. 4.

In step 902 a retention date-time request is received via a web-based filesystem protocol like WebDAV, wherein: a) the retention date-time request is received from an ILM component like ILM Component 202; b) the ILM Component 202 comprises a performance requirement to apply a retention date-time to a filesystem object, for example SAP BC-ILM3.0; and c) the retention date-time request is for the filesystem object in a content management system like that described in FIG. 2.

The retention date-time request may be associated with one or more of the following: a PropPatch request, a PropFind request, a MkCol request, a Put request, and a Delete request. The retention date-time request may be XML based. The retention date-time request may be one or more of the following: a set retention date request, a retrieve retention date request and a legal hold request. The set retention date request and the retrieve retention date request comprises a date-time and value pair, and the legal hold request may comprise a Boolean value.

In step 904, the retention date-time request is extracted from the web-based filesystem protocol to process a retention date-time within a meta information store 214 associated with a document content server 210.

In step 906, a records manager is enabled to use the document content server meta information store for policy enforcement processes. In some embodiments, the retention date-time request may be cascaded (via inheritance propagation) to associated filesystem objects within the filesystem object in the event the retention date-time request is a retention date request and the filesystem object is a folder-type.

Chronological Based Advantages

One drawback with the previously existing event based approach to set the retention date is that the system must iterate all the possible events associated with a given filesystem object to find the specified event of interest to set the passed in retention date.

The RM/RPS API 216 does not have any lookup facilities to apply the retention date directly based on the event name.

In any ILM component 202 there is a need to store several properties with the archived document or folder. From the scope of retention within ILM all the properties other than the retention property do not serve much purpose as most of the ILM functionalities center around the retention date associated with the document or folder.

In existing RM/RPS APIs 216, this results in a creation of several events. There may need to be one event for every property that needs to be stored on the document or folder. This effectively has algorithmic time complexity of O(n) in worst case to find a specific event and to apply the retention for all the 'n' events associated with the filesystem object. The performance is further affected when we iterate for a given folder having many child folders or documents as the system looks for the specified event in all the child folders or the documents in an iterative fashion. This approach has a large negative impact on overall performance and time taken to propagate PROPPATCH and/or PROPFIND request, as shown in steps. This is clearly shown in step 512 of FIG. 5 and step 610 of FIG. 6; the system is unable to avoid the iterative process to look up the event to set or get the retention date.

A chronological-based retention algorithm improves performance by reducing the time taken to set the retention on the archived filesystem object. It makes use of the retention property on the document or folder within DCS 210 to set the passed in retention date from the ILM component 202 or to fetch the retention value.

The chronological-based algorithm takes care of setting/getting the retention property from the archived document or folder in algorithmic O(1) constant time as shown in steps 712 or 714 of FIG. 7 and step 808 of FIG. 8; the system can directly apply the retention property to lookup the value to fetch or set.

Thus this improves the performance for applying the retention time on the archived documents by reducing the time taken to set, avoiding the iteration for finding the specific event and making use of the existing retention property of the DCS 210. The chronological-based approach has the benefit of O(1) algorithmic time complexity in comparison to the O(n) approach taken by the event-based RM/RPS API. This permits various ILM Connector 204, DCS 210 and RM/RPS API 216 to comply with, for example, the performance requirements of SAP BC-ILM 3.0, permitting successful certification of SAP BC-ILM 3.0.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a retention date-time request via a web-based filesystem protocol, wherein the web-based filesystem protocol is WebDAV, wherein the retention date-time request is received from an information lifecycle management ("ILM") component and comprises an associated retention value, the ILM component comprises a performance requirement to apply a retention date-time to a filesystem object stored in a content store of a document content server, and the retention date-time request is for the filesystem object in a content management system;

extracting the received retention date-time request from the web-based filesystem protocol to process the retention date-time within a meta information store of the document content server;
determining a type of filesystem object to which the retention date-time is to be applied;
in the event the type of filesystem object is a folder, cascading the received retention date-time request to associated filesystem objects within the filesystem object stored in the content store of the document content server;
determining whether a retention value has been applied to the filesystem object; and
in the event the retention value has been applied to the filesystem object, comparing the retention value associated with the filesystem object with the retention value associated with the retention date-time request and if valid, setting the retention value directly on a retention property associated with the filesystem object based on the retention value associated with the retention date-time request, the retention property stored in the meta information store of the document content server; and
in the event the retention value has not been applied to the filesystem object, setting the retention value associated with the filesystem object based on the received retention date-time request; and
enabling a records manager to use the meta information store associated with the document content server for policy enforcement processes, wherein a records management and retention policy service associated with the records manager and the document content server applies a retention policy associated with the filesystem object.

2. The method of claim 1, wherein the retention date-time request is associated with one or more of the following: a PropPatch request, a PropFind request, a MkCol request, a Put request, and a Delete request.

3. The method of claim 2, wherein the retention date-time request is one or more of the following: a set retention date request, a retrieve retention date request and a legal hold request.

4. The method of claim 3, wherein the retention date-time request is XML based.

5. The method of claim 3, wherein the set retention date request and the retrieve retention date request comprises a date-time and value pair.

6. The method of claim 3, wherein the legal hold request comprises a Boolean value.

7. The method of claim 1, wherein the ILM component is a SAP component.

8. The method of claim 7, wherein the performance requirement is SAP BC-ILM 3.0 certification.

9. The method of claim 1, wherein the document content server is associated with the records management and retention policy service to store and retrieve properties associated with the filesystem object.

10. The method of claim 9, wherein the records management and retention policy service uses an iterative event-based metadata storage system to store and retrieve properties associated with the filesystem object.

11. The method of claim 10, wherein the records management and retention policy service also uses the iterative event-based metadata storage system for ten or more other date-time properties.

12. The method of claim 1, wherein the meta information store includes a property directly associated with a given filesystem object that describes a time until which the given filesystem object is retained.

13. The method of claim 1, wherein:
extracting the received retention date-time request from the web-based filesystem protocol comprises determining that the WebDAV request includes a PROPPATCH request containing a retention date to be set; and
setting the retention value associated with filesystem object based on the retention value associated with the retention date-time request further comprises directly setting the retention date on a retention property in the meta information store, the retention property associated with the filesystem object.

14. A system, comprising:
an information lifecycle management ("ILM") connector coupled to an ILM component, coupled to a document content server;
a processor associated with the ILM connector and configured to:
receive, from the ILM component, a retention date-time request via a web-based filesystem protocol, wherein the web-based filesystem protocol is WebDAV, wherein the retention date-time request comprises an associated retention value, the ILM component comprises a performance requirement to apply a retention date-time to a filesystem object stored in a content store of a document content server, and the retention date-time request is for the filesystem object in a content management system;
extract the received retention date-time request from the web-based filesystem protocol to process the retention date-time within a meta information store associated with the document content server;
determine a type of filesystem object to which the retention date-time is to be applied;
in the event the type of filesystem object is a folder, cascade the received retention date-time request to associated filesystem objects within the system object stored in the content store of the document content server;
determine whether a retention value has been applied to the filesystem object; and
in the event the retention value has been applied to the filesystem object, compare the retention value associated with the filesystem object with the retention value associated with the retention date-time request and if valid, set a retention value directly on a retention property associated with the filesystem object based on the retention value associated with the retention date-time request, the retention property stored in the meta information store of the document content server; and
in the event the retention value has not been applied to the filesystem object, set the retention value associated with the document based on the received retention date-time request; and
enable a records manager to use the meta information store associated with the document content server for policy enforcement processes, wherein a records management and retention policy service associated with the records manager and the document content server applies a retention policy associated with the filesystem object; and
a memory coupled to the processor and configured to provide the processor with instructions.

15. The system recited in claim 14, wherein:
the retention date-time request is associated with one or more of the following:
a PropPatch request, a PropFind request, a MkCol request, a Put request, and a Delete request; and
the retention date-time request is one or more of the following: a set retention date request, a retrieve retention date request and a legal hold request.

16. The system recited in claim 14, wherein:
the document content server is associated with the records management and retention policy service to store and retrieve properties associated with the filesystem object;
the records management and retention policy service uses an iterative event-based metadata storage system to store and retrieve properties associated with the filesystem object; and
the records management and retention policy service also uses the iterative event-based metadata storage system for ten or more other date-time properties.

17. The system recited in claim 14, wherein:
extracting the received retention date-time request from the web-based filesystem protocol comprises determining that the WebDAV request includes a PROPPATCH request containing a retention date to be set; and
the ILM connector comprises an API configured to directly set the retention date on a retention property in the meta information store to set the retention value associated with filesystem object based on the retention value associated with the retention date-time request, the retention property associated with the filesystem object.

18. A computer program product, the computer program product being embodied in a non-transitory computer readable storage medium and comprising computer instructions for:
receiving a retention date-time request via a web-based filesystem protocol, wherein the web-based filesystem protocol is WebDAV, wherein the retention date-time request is received from an information lifecycle management ("ILM") component and comprises an associated retention value, the ILM component comprises a performance requirement to apply a retention date-time to a filesystem object stored in a content store of a document content server, and the retention date-time request is for the filesystem object in a content management system;
extracting the received retention date-time request from the web-based filesystem protocol to process the retention date-time within a meta information store associated with the document content server;
determining a type of filesystem object to which the retention date-time is to be applied;
in the event the type of filesystem object is a folder, cascading received the retention date-time request to associated filesystem objects within the filesystem object stored in the content store of the document content server;
determining whether a retention value has been applied to the filesystem object; and
in the event the retention value has been applied to the filesystem object, compare the retention value associated with the filesystem object with the retention value associated with the retention date-time request and if valid, setting a retention value directly on a retention property associated with the filesystem object based on the retention value associated with the retention date-time request, the retention property stored in the meta information store of the document content server; and in the event the retention value has not been applied to the filesystem object, setting the retention value associated with the filesystem object based on the received retention date-time request; and enabling a records manager to use the meta information store associated with the document content server for policy enforcement processes, wherein a records management and retention policy service associated with the records manager and the document content server applies a retention policy associated with the filesystem object.

19. The computer program product recited in claim 18, wherein:

the retention date-time request is associated with one or more of the following:

a PropPatch request, a PropFind request, a MkCol request, a Put request, and a Delete request; and the retention date-time request is one or more of the following: a set retention date request, a retrieve retention date request and a legal hold request.

20. The computer program product recited in claim 18, wherein:

the document content server is associated with the records management and retention policy service to store and retrieve properties associated with the filesystem object;

the records management and retention policy service uses an iterative event-based metadata storage system to store and retrieve properties associated with the filesystem object; and the records management and retention policy service also uses the iterative event-based metadata storage system for ten or more other date-time properties.

21. The computer program product recited in claim 18, wherein:

extracting the received retention date-time request from the web-based filesystem protocol comprises determining that the WebDAV request includes a PROPPATCH request containing a retention date to be set; and setting the retention value associated with filesystem object based on the retention value associated with the retention date-time request further comprises directly setting the retention date on a retention property in the meta information store, the retention property associated with the filesystem object.

* * * * *